United States Patent
Williams

(10) Patent No.: US 7,965,858 B2
(45) Date of Patent: Jun. 21, 2011

(54) DATA PROCESSING APPARATUS AND METHOD

(75) Inventor: Michael John Williams, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 858 days.

(21) Appl. No.: 11/389,248

(22) Filed: Mar. 27, 2006

(65) Prior Publication Data
US 2006/0251289 A1    Nov. 9, 2006

(30) Foreign Application Priority Data
May 5, 2005    (GB) .................................. 0509218.4

(51) Int. Cl.
*G06K 9/00*    (2006.01)
(52) U.S. Cl. .................... 382/100; 380/255; 380/277
(58) Field of Classification Search ............... 382/100
See application file for complete search history.

(56) References Cited

U.S. PATENT DOCUMENTS

| | | | | |
|---|---|---|---|---|
| 6,912,294 B2 * | 6/2005 | Wang et al. | .................... | 382/100 |
| 2002/0080964 A1 * | 6/2002 | Stone et al. | .................... | 380/255 |
| 2004/0009763 A1 * | 1/2004 | Stone et al. | .................... | 455/410 |
| 2004/0085342 A1 * | 5/2004 | Williams et al. | .............. | 345/723 |

FOREIGN PATENT DOCUMENTS

| | | |
|---|---|---|
| GB | 2 369 943 A | 6/2002 |
| WO | WO 03/067886 A1 | 8/2003 |

\* cited by examiner

*Primary Examiner* — Hadi Akhavannik
(74) *Attorney, Agent, or Firm* — Oblon, Spivak, McClelland, Maier & Neustadt, L.L.P.

(57) ABSTRACT

An encoding data processing apparatus configured to parse a compression encoded bit stream to identify frames of a video image, and to determine for image frame areas of the compression encoded bit stream providing spare data capacity as a result of the fixed data portion not being completely filled with macroblocks; to first check within the macroblocks whether an additional amount of data required to represent the entire visible watermark can be accommodated in a memory space formed by the spare data capacity of the image frame; and after it has been determined that the additional data for representing the entire visible watermark can be accommodated within the spare data capacity, to change selected macroblocks of the image frame to represent the visible watermark; to generate a bit pattern representing the macroblocks in the original image frame which have changed to represent the visible watermark; and to insert all the additional data into the areas providing the spare data capacity of the fixed data portions of the image frame.

20 Claims, 8 Drawing Sheets

DATA PROCESSING APPARATUS AND METHOD

FIELD OF THE INVENTION

The present invention relates to data processing apparatus operable to introduce visible watermarks into video images represented by compression encoded bit streams.

BACKGROUND OF THE INVENTION

Watermarking is a technique in which information is combined with or represented in some way in host material such as video images. There may be various reasons for representing the information in the material. In some applications, the information is combined with the material in a way which makes it as difficult as possible to detect the presence of the information. In other applications the video material may be watermarked with the effect that the information is visible within the video image.

UK Patent application 0029852.1 discloses an arrangement for introducing a visible watermark into a video image. The visible watermark may be introduced by selecting parts of digital samples of the video image, and modifying the samples to represent the visible watermark. Furthermore, the watermark is encoded in the video material in a way, which allows it to be removed to recover the original video images. The watermark is therefore encoded into the video image with a reversible function. Also disclosed in this UK Patent application is that a bitmap template may be formed to represent the samples of the image that are to be changed to represent the watermark.

UK Patent application 0215403.7 discloses an arrangement for introducing a watermark into an MPEG-2 encoded video image. The watermark is introduced by adapting the DCT coefficients of the MPEG-2 video image in a way, which does not increase an amount of the compression encoded data representing the video image. Those parts of the video image which are changed in order to represent the watermark are removed and introduced into an modified MPEG-2 bit stream in spare data areas appended to the end of the bit stream.

UK Patent applications 0029850.5 and 0121997.8 disclose an arrangement for introducing a visible watermark into a compression encoded bit stream by making pseudo random changes to the bit stream in accordance with a substantially invertible algorithm. The changes are invertible with the effect that the changes can be removed, and because the algorithm does not substantially change the number of entropy encoded bits, so that the compression encoded bit stream can be decoded with a conventional decoder. The visible watermark is introduced by changing a Discrete Cosine Transform (DCT) coefficients, which represent the encoded video image.

Some applications, visible watermarking can provide an arrangement for previewing video content, in order to allow the viewer the opportunity to sample the content before committing to acquire that content. Thus, for example, a viewer can preview the content before buying that content, the previewed content including the watermark so that copying or using the content without payment is discouraged. As explained above, since a visible watermark has been added in a way, which is invertible, a viewer may be sent data for removing the watermark upon payment.

Although these known watermarking techniques can be used to form visible watermarks in compression encoded bit streams, the complexity of the compression encoding can make it difficult to adapt the visible watermark within the video images.

SUMMARY OF THE INVENTION

An object of the present invention is to provide an arrangement in which an amount of spare data capacity within a compression encoded bit stream is utilised in order to convey data associated with a visible watermark.

According to the present invention there is provided an encoding data processing apparatus operable to introduce a visible watermark into a compression encoded video image represented by a compression encoded bit stream having a predetermined format. The format of the compression encoded bit stream provides image frames which are represented by macroblocks, each macroblock representing a block of pixels from the image frame, the macroblocks being formed into groups of macroblocks which are contained in fixed portions of the compression encoded bit stream. The fixed data portions are able to accommodate a predetermined fixed amount of data. The encoding data processing apparatus is operable to parse the compression encoded bit stream to identify each of the frames of the video image, and for each image frame of the compression encoded bit stream spare data capacity in each frame provided from each of the fixed data portions as a result of the fixed data portion not being completely filed with the macroblocks is determined. The encoding data processing apparatus is operable to determine whether an additional amount of data required to represent the visible watermark in the compression encoded bit stream can be accommodated in the spare data in each image frame. If the additional data for representing the visible watermark can be accommodated within the spare data capacity, the encoding data processing apparatus is operable to change selected macroblocks in an original version of the image frame to represent the visible watermark and to generate a bit pattern representing the macroblocks in the original image frame which have changed to represent the visible watermark. The encoding data processing apparatus is then operable to insert the additional data into the fixed data portions of the image frame at predetermined positions within an area providing the spare data capacity, the additional data comprising the bitmap and data associated with an original form of each of the macroblocks which have changed to represent the visible watermark.

In some embodiments the video images are encoded in accordance with the Society for Motion Picture Television Engineers (SMPTE) video coding standard known as Digital Video (DV), or DV mode. Corresponding standards exist for consumer products in IEC 61834. Therefore, it will be appreciated that DV or DV mode as used herein is a reference to any of these standards. The form of the compression encoded data stream, is not limited to any particular data format, thus the compression encoded bit stream may be stored on tape based formats or on optical disc and other optical storage media, and may be transmitted as a signal.

An encoding data processing apparatus according to the present invention is arranged to utilise an amount of spare data capacity within a compression encoded bit stream in order to convey data associated with a visible watermark.

There are various ways in which a visible watermark may be encoded into the video image. In some embodiments the macroblock associated with a visible watermark may be extracted and replaced by a macroblock representing a particular pattern for example white, which is correspondingly encoded with appropriate transform domain coefficients. For example, the transform domain representation may be formed using the Discrete Cosine Transform (DCT). In other embodiments the visible watermark is formed as a mosaic pattern in which AC coefficients of the transform domain representation are removed and the macroblock is only represented by DC coefficients. As a result, a visible watermark is produced in accordance with the macroblocks which are selected and for which the AC coefficients are removed. Thus, according to some embodiments of the present invention, some data may be extracted from the compression encoded bit stream and included as part of the additional data conveyed within the spare data capacity of the bit stream so that the watermark can be removed subsequently. According to embodiments of the present invention a bitmap identifying the macroblock blocks in each image frame which have been changed in accordance with the visible watermark is generated and stored within the spare data capacity of the compression encoded bit stream. In some embodiments the bitmap may be entropy encoded.

Furthermore, in some embodiments a keyword is added to the compression encoded bit stream to identify each frame in the compression encoded bit stream, which has been altered with a visible watermark. As a result, embodiments of the present invention provide a visible watermarking scheme with particular advantages. One advantage is that the watermark can be changed on a per frame basis. Another advantage is that the watermark may be more easily removed from each frame by detecting the keyword in each frame. If the keyword is present for a frame then a decoder will know that the image frame includes a visible watermark and therefore processes the visible watermark by extracting the bitmap template to identify those macroblocks, which have changed.

Embodiments of the present invention can provide an arrangement in which a visible watermark can be introduced into a compression encoded video image on a per frame basis. As such the visible watermark can provide valuable information which can facilitate the processing of the video images. For example, in some embodiments a particular camera, which captured the video image can be identified by the visible watermark. In other embodiments time code information is removed from the compression encoded bit stream and represented as the visible watermark for each frame. The camera which captured the video images and the time code are examples of valuable information which can facilitate editing of the video images and which can furthermore be easily removed when a final version of the video images is to be generated. In other examples, the visible watermark may represent proxy video, which provides a low resolution representation of full bandwidth video images.

In some embodiments and as indicative examples only, the additional data included in each image frame provides:
  the keyword indicating that the frame has been adapted to represent a visible watermark;
  a Unique Material Identifier (UMID);
  a flag indicating a type of the watermark present in the image frame;
  any data extracted from the bit stream to represent the visible watermark; and
  the bitmap identifying those macroblocks in the image frame which have changed.

Examples of watermark types indicated by the flag are a mosaic, a time code or a video format of the compression encoded bit stream.

Various further aspects and features of the present invention are defined in the appended claims. These aspects include a data processing apparatus for removing a visible watermark, a method of processing data to introduce a visible watermark and a computer program representing a method of introducing a visible watermark.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
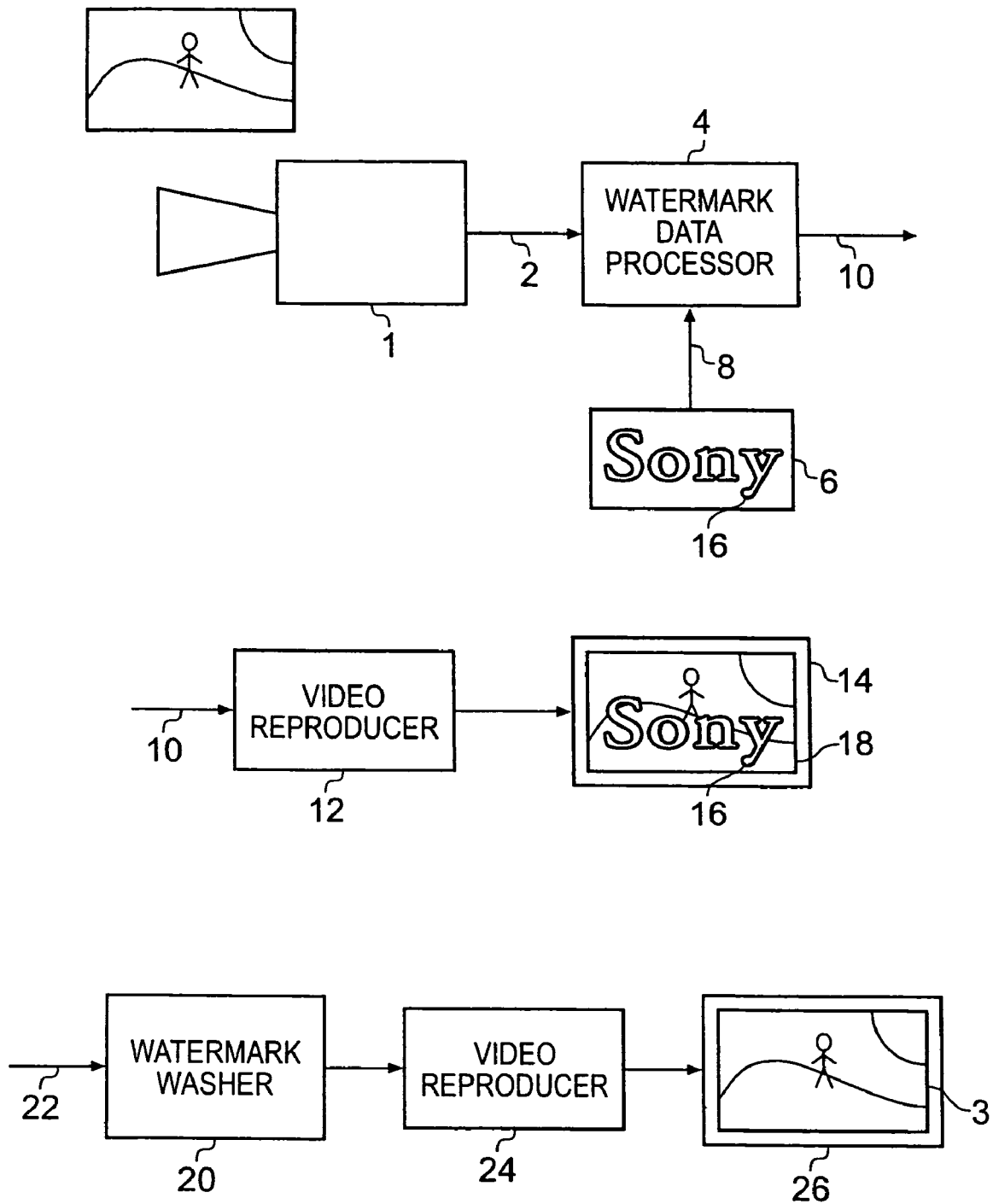
FIG. 1 is a schematic block diagram illustrating components which are arranged to introduce a visible watermark into a compression encoded video image and to remove the visible watermark from the compression encoded video image.

FIG. 1 provides a diagram showing an arrangement for introducing a visible watermark into a video image. As shown in FIG. 1 a video camera 1 captures images and generates a video signal representing the images which is fed on a channel 2 to a watermark data processor 4. The watermark data processor 4 is arranged to receive data representing a visible watermark, which is to be introduced into the video image from a watermark data generator 6 via a channel 8. Thus at the output of the watermark data processor 10 a video image is produced which includes a visible watermark. Therefore, for example, if the watermarked image is fed into a video reproducing apparatus 12 which regenerates the video images for display on a display screen 14 the visible watermark includes a visible representation of the watermark data 16 superimposed or visually identifiable within the video image 18. In some embodiments the visible watermark may be encoded to the effect that it is difficult to remove from the video images. To this end, data representing the visible watermark may be encrypted within the video stream, removal of the visible watermark being thereby hindered without appropriate encryption keys. However, as will be appreciated it may be desirable to remove the visible watermark. To this end, FIG. 1 shows a watermark removing data processor known as a watermark washer 20 which may receive the watermarked video image on an input channel 22 to remove the visible watermark. When the video image is reproduced by a video reproducer 24 for display on a display device 26 the original image 3 is produced without the presence of a visible watermark.

According to the present technique a visible watermark is introduced into a compression encoded video image with the effect that each frame may or may not include a visible watermark. Furthermore, the watermark may be different for each frame. To this end, the watermark data processor 4, which is arranged in accordance with the present technique adapts the video image to introduce the visible watermark on a per frame basis to produced an adapted compression encoded bit stream. The adapted compression encoded bit stream represents the adapted video image. The adapted compression encoded bit stream includes any data, which has been removed from each of the image frames so that the visible watermark can be represented, together with additional data which is necessary to restore the original form of the compression encoded bit stream and correspondingly the original form of the video images. As will be appreciated therefore, in order to produce the adapted compression encoded bit stream, it is necessary to identify whether there is sufficient space in the compression encoded video stream to introduce this additional watermark data without increasing the bit rate of the adapted compression encoded video stream. By not increasing the bit rate of the adapted compression encoded bit stream, the video image can be correctly decoded by a decoder operating in accordance with the compression encoding/decoding standard, although small changes in bit rate may be tolerated.

One example of compression an encoding/decoding process with which the present technique can be used is the Digital Video (DV) or DV-mode. DV is a compression encoding process, which has a standardised. The standard is administered by the International Standards Organisation and defined by the Society of Motion Picture and Television Engineers (SMPTE). A complete description of DV mode will not be given here. However, a brief explanation of the DV mode compression encoding bit stream will be provided in the following paragraphs with reference to the present technique and with reference to FIGS. 2, 3 and 4.

Figure 2:
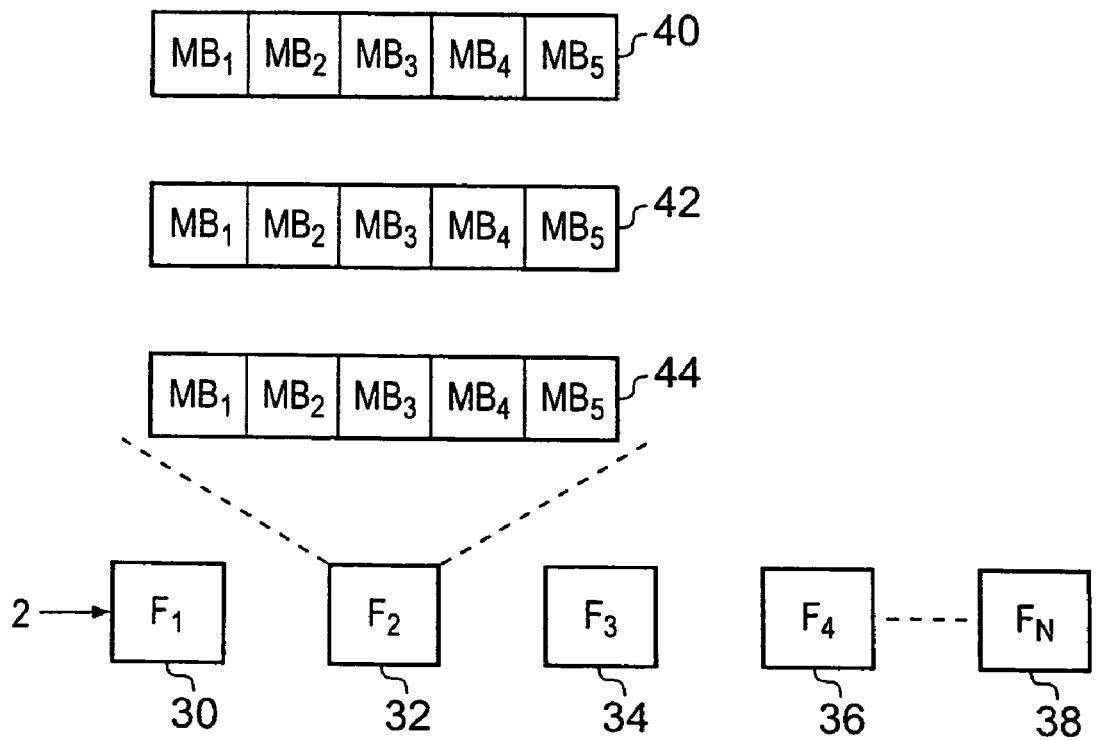
FIG. 2 is a schematic representation of a compression encoded bit stream in accordance with the Digital Video mode format.

There are various modes for DV. One mode provides a data rate of 25 megabits per second and is referred to as DV25. DV25 uses an intra-frame Discrete Cosine Transform (DCT) compression process in which each frame is divided into marcoblocks and each macroblock is transformed into the DCT domain and compression encoded. In DV25 mode there is no prediction between frames so that all frames are coded as intra-frame coded frames. In one example, the colour sampling of the images may be 4:1:1 with four luminance samples to each of two chroma samples. In the compression encoded bit stream the groups of macroblocks are divided into segments and each segment is allocated a predetermined fixed amount of data, which forms a fixed data portion within the compression encoded data stream. Thus as shown in FIG. 2, the compression encoded DV mode bit stream encodes a plurality of image frames 30, 32, 34, 36, 38 which represent video images 40, 42, 44. As illustrated for a second of the frames 32, the image frames are encoded as a plurality of segments of macroblocks 40, 42, 44. As explained below, each segment comprises five macroblocks MB1, MB2, MB3, MB4, MB5, with each macroblock being allocated a fixed portion of data capacity within the bit stream. Thus the macroblock must be accommodated within this fixed amount of data, and if not, must overflow to another data area allocated to another mcroblock, where another of the macroblocks has not occupied the entire portion of the allocated data capacity. As will be explained shortly, not all of the data capacity allocated for each of the macroblocks is occupied by the data representing that macroblock, which can provide, when concatenated together, a sufficient quantity for accommodating data for representing a watermark.

According to the present technique, the compressed encoded bit stream according to for example the DV mode is parsed to identify an amount of spare data capacity in each image frame by comparing the amount of data in each of the fixed data portions with respect to an amount of data which is actually occupied by the macroblocks.

Figures 3A, 3B:
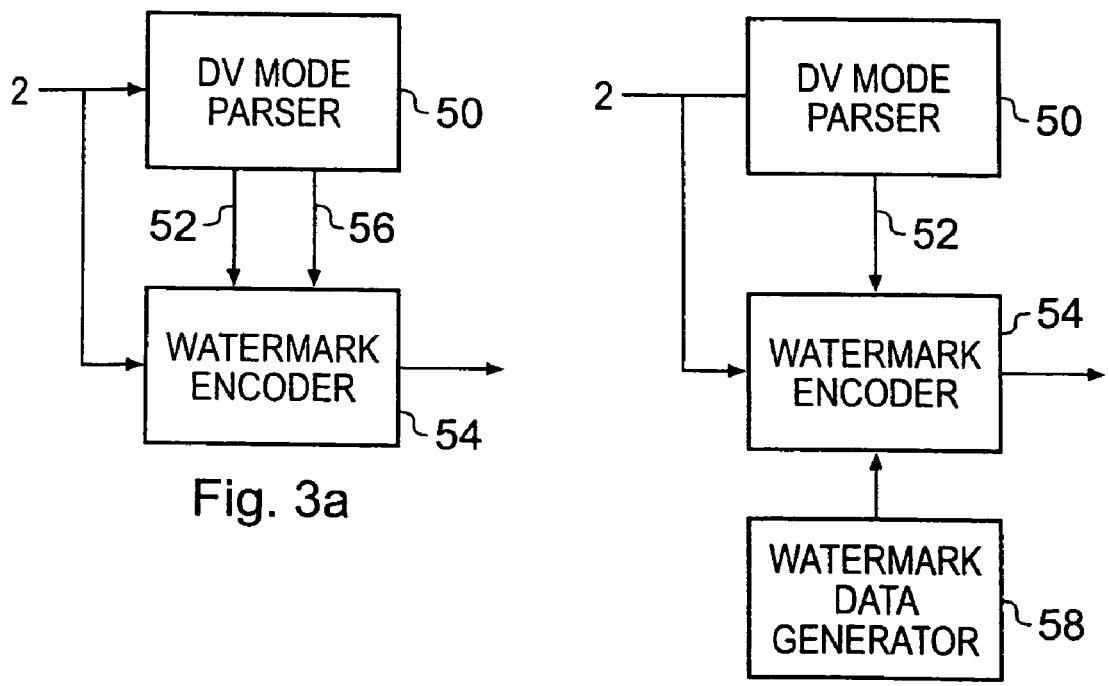
FIG. 3A is a schematic block diagram of an encoding data processing apparatus arranged to introduce a visible watermark into a compression encoded bit stream.
FIG. 3B is a further example schematic block diagram of an encoding data processing apparatus arranged to introduce a visible watermark into a compression encoded bit stream.

FIGS. 3A and 3B illustrate example watermark encoding data processing apparatus using the present technique. As shown in both FIGS. 3A and 3B, the watermark encoding data processing apparatus receive on an input channel 2 a DV mode bit stream. A DV mode parser 50 receives the compression encoded bit stream parses each fixed data portion, which contains a group of macroblocks to calculate a total amount of spare data capacity per image frame. The total amount of spare data capacity is then fed to a watermark encoder 54, which is arranged to adapt each image frame to represent the visible watermark, provided that the total amount of spare data capacity per frame can accommodate additional data which is associated with the visible watermark.

The encoding data processing apparatus shown in FIG. 3A differs from that shown in 3B because the encoding data processing apparatus shown in FIG. 3B includes a watermark data generator 58 (which corresponds to the example shown in FIG. 1). As shown in FIG. 3A a channel 56 is provided in addition to the channel 52 via which the amount of capacity available in each image frame is fed to the watermarking encoder 54. The second channel 56 shown in FIG. 3A is provided for data, which is to be represented as the visible watermark in the video images. In accordance with the present technique the visible watermark can represent data, which is encoded as part of the compression encoded bit stream. For the example of DV mode, time code information is provided for each frame represented in the DV mode compression encoded bit stream. As such, in one example the DV mode parser 50 feeds data representing the time code to the watermark encoder 54 and the visible watermark represented in the video image is in fact the time code of the frame. In other examples, the particular format of the DV mode which is provided in a header of the bit stream is also fed on the channel 56 to represent the visible watermark.

In contrast the watermark encoding data processing apparatus shown in FIG. 3B generates a separate watermark as, for example, illustrated in FIG. 1.

Figure 4:
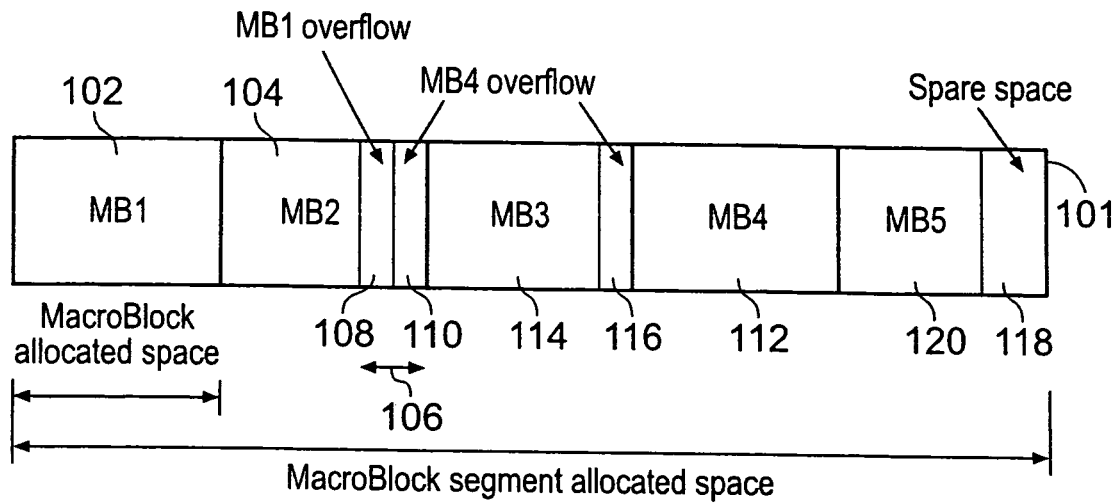
FIG. 4 is a schematic representation of a compression encoded bit stream in accordance with the Digital Video mode format illustrating a process of packing data which overflows from macroblock area into another macroblock area and spare data capacity.

The coding of the visible watermark in the compression encoded video stream as performed by the watermark encoder 54 will now be explained with reference to FIGS. 4 and 5.

The DV mode compression encoding standard forms a hierarchy of blocks/macro blocks. Each image, in pixels, is split into 8×8 blocks, which are Discrete Cosine transformed. Each DCT block is made up of one DC coefficient and, perhaps, several AC coefficients. Before quantisation there will be one DC and 8*8−1 AC coefficients. These DCT blocks, after quantising and variable length (entropy) coding etc, are grouped depending on the colour standard (4:2:2, 4:1:1, 4:2:0) into macroblocks. Therefore one macroblock makes up six DCT blocks (for the example of 420: four luminance samples+two chroma samples). The next step in the hierarchy is macroblock units. These are collections of groups of five macroblocks called Macro Block Segments in the DV specification.

Each DCT block has a fixed amount of space allocated to it. If this is insufficient to hold that DCT block's entropy encoded coefficients, then, if any of the other DCT blocks in that macroblock have not used their allocated space, then that is used to accommodate the extra data of the macroblock which cannot be allocated within the fixed data amount allocated to that macroblock. In a similar way, data which is required to represent a watermark can be accommodated if there is any spare space in a macroblock unit. FIG. 4 provides an illustration of a macroblock segment 101 in which packing has been made of the five macroblocks in the segment and in which there is spare space available. As can be seen the first macroblock MB1 is allocated a predetermined amount of space in an area 102 of the segment 101. However, when encoding the macroblock MB1, the allocated area 102 is not sufficient in this example to accommodate all of the data required to represent the encoding of MB1. However, within a second data area 104, which is allocated to contain a second of the five macroblocks MB2, an amount of spare data capacity 106 is provided. As shown, for this example, the spare data capacity 106 is used to store a remaining portion of data 108, from the macroblock MB1, which could not be accommodated within the area 102 which had been allocated to the first macroblock MB1. The remaining part of the spare amount of data capacity 106, is allocated in this example to store a part of the data 110 from a fourth of the macroblocks MB4, which could not be accommodated within a fourth data area 112. Allocating data capacity from an area which has not been completely used, to convey data from a macroblock allocated to that area, to convey data from a macroblock which cannot be accommodated within an area allocated to that macroblock is known as "packing". For a further example, as shown, a third of the macroblocks MB3 provides some spare capacity 114 within an area 116, which has been allocated to convey data from the fourth macroblock MB4. Finally, in this example, an area 118 is provided within a data area 120 which has been allocated to convey a fifth of the five macroblocks MB5, which can be used to accommodate additional data, which is required to represent the watermark of the image. Therefore, for this example, each of the five mabroblocks MB1, MB2, MB3, MB4, MB5 have been accommmodated within the spaces 102, 104, 114, 116, 120 allocated for the macroblocks.

Figure 5:
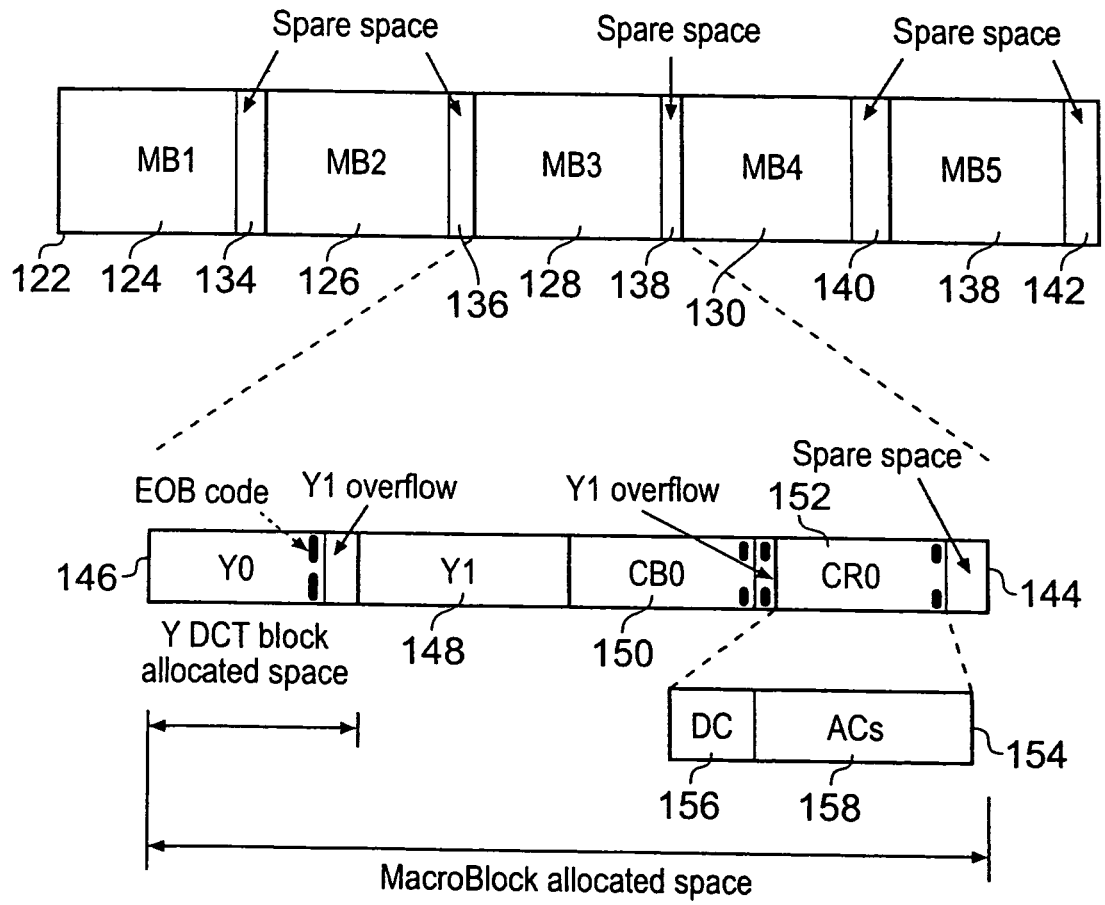
FIG. 5 is a schematic representation of another example compression encoded bit stream in accordance with the Digital Video mode format illustrating areas where spare data areas can be identified in the compression encoded bit stream.

FIG. 5 shows a more detailed example illustrating a macroblock segment 121, in which no packing is needed to accommodate data from macroblocks which cannot be accommodated within an area allocated to each of the macroblocks. As shown in FIG. 5, a macroblock segment 122 is shown to convey data representing five macroblocks MB1, MB2, MB3, MB4, MB5 within five respective areas 124, 126, 128, 130, 132. For the example shown in FIG. 5, each of the designated areas 124, 126, 128, 130, 132 is not completely filed by the data representing the corresponding macroblocks MB1, MB2, MB3, MB4, MB5 and so each provides respectively an area of spare space for accommodating data 134, 136, 138, 140, 142. It is this spare space, accumulated across the macroblock segments of the frame, which is used to convey the additional data associated with the watermark. Thus, for each frame of data the macroblock segments are parsed and a total amount of spare data space determined. This spare data space is then compared to the total amount of additional data, which is required to represent the watermark. As will be explained shortly, the additional data includes; a keyword indicating the presence of the watermark data in the frame, a Unique Material Identifier, a bit map identifying the location of the watermark in the frame, a flag indicating the watermarking type and any data inserted to produce the watermark. If this data can be accommodated within the spare data space, then the additional watermark data is added to the frame in the spare data spaces and this frame is watermarked.

As shown in FIG. 5, an illustration is provided which represents the DCT blocks which make up a macroblock, for each of the luminance and chrominance samples of the macroblock. As shown for macroblock MB3 from an area 128 within the macroblock segment 144, the data for representing the macroblock MB3 comprises a set of DCT blocks, for each of the two luminance data samples Y0, Y1, respectively 146, 148 and two chrominance data samples CB0, CR0 respectively 150, 152. As shown for the example of the second chrominance block CR0 within an allocated area 152, the data samples are comprised of a set of DCT coefficients 154. The set of DCT coefficients 154 comprises one DC coefficient 156 and four AC coefficients 158.

When variable length encoded, each DCT block is terminated with an End of Block (EOB) marker or EOB code. Therefore, in one macroblock, for the 4:2:0 example above, there will be four EOBs: one per DCT block. Correspondingly for 4:1:1 and 4:2:0 there would be six EOB codeAs a result, because each DCT block ends with an EOB code, if an EOB has not been found, when the fixed space for that DCT block has been reached, the DV mode parser 50 can determine that the remainder of that macroblock has been written into space which has been formed by another DCT block, which has not used its allocated space. Similarly, if the EOB is decoded before the fixed space for that DCT block has been reached, then the DV code parser 50, can determine that another DCT block has overflowed into that remaining space, which is also followed by an EOB code. If no EOB is provided, then the parser can determine that the remaining data area is spare space and can use this to convey additional data.

Parsing the DV mode bit stream to identify the spare data space is therefore done by decoding in accordance with a three stage process:

1) Decode each DCT block's fixed space, up to either the end of the fixed space, or an EOB code.

2) For each of the DCT blocks in a macroblock where an EOB code has not been found, read the other DCT block's remaining code space (the ones for which an EOB has been found).

3) If there are still DCT blocks for which EOB codes have not been found, step 2 is performed over the marcoblock segment.

Accordingly, in order to identify the amount of spare data spare for accommodating the additional watermark data in the DV mode bitstream, the three decoding steps indicated above are performed. This can be interpreted as identifying the space from every DCT block that does not need all of the space that has been allocated to it. This space is then concatenated together, after the first attempt to fill the fixed space. The "packing" consists of putting the concatenated overflow data into the concatenated space. This is first done for DCT blocks within the same macroblock. Then, if there is still overflow data, a similar process is done for macroblocks within the same macroblock segment by concatenating spare space in each of the macroblocks, and separately concatenating extra data from each macroblock, and then trying to fit the data into the space. If there is still space available after the data from the five macroblocks has been packed into the allocated areas, then this data is identified as spare data capacity for conveying the additional data. Thus, to identify the spare data capacity the compression encoded bit stream must be parsed, to the effect of partially decoding the bit stream in order to identify this spare data capacity.

Figure 6:
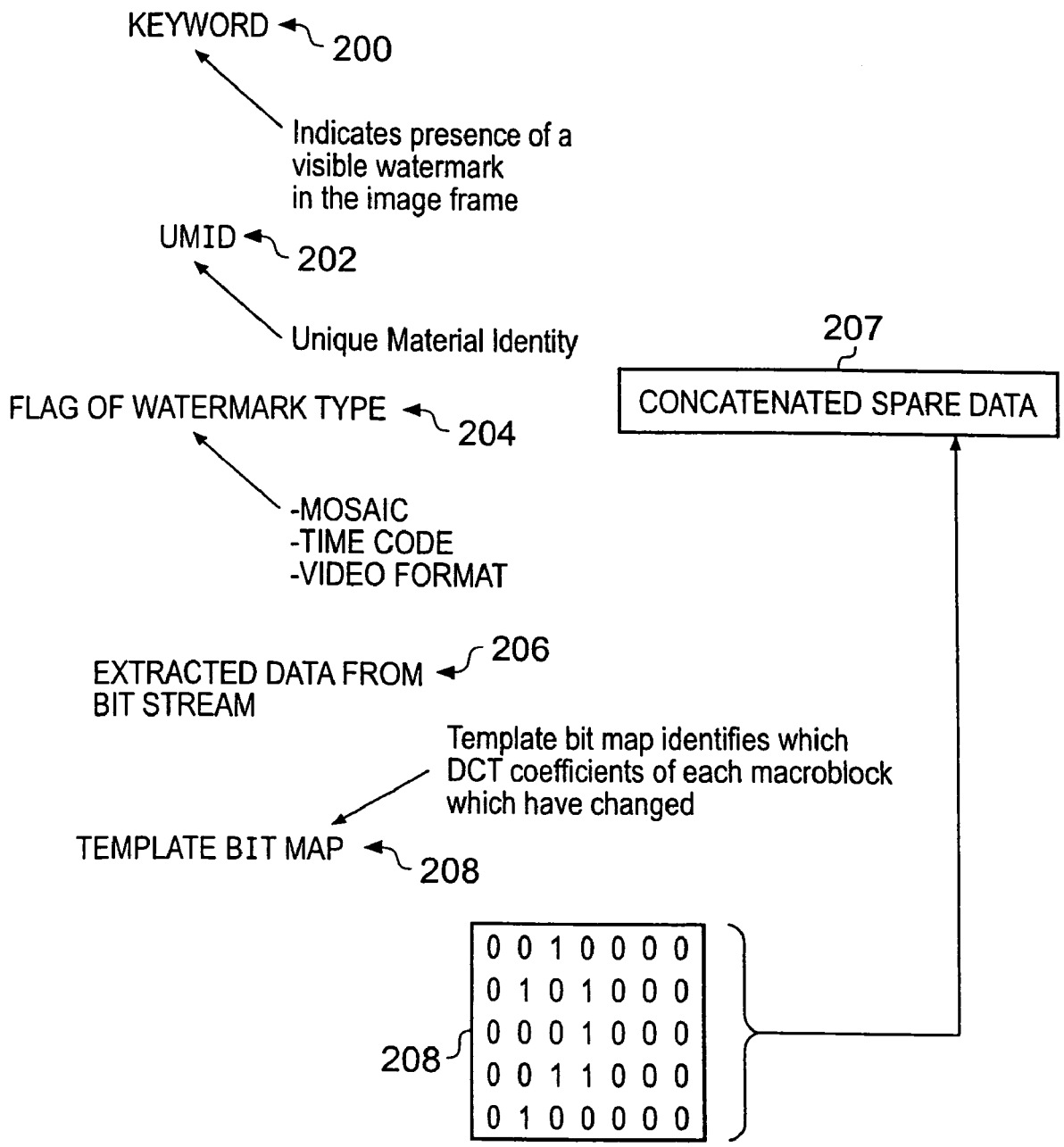
FIG. 6 is a schematic representation of additional watermark data, which is included in an image frame to represent a watermark.

As indicated above, in addition to any of the original macroblock data, which is extracted from the fixed portions to represent the watermark and placed in the spare area, the watermarking encoder also includes additional information to allow the watermark to be more easily removed. The format of this additional information is represented in FIG. 6. The additional information comprises a keyword 200, which is set to a predetermined hexadecimal word for example, such as OXDEADBABE. The keyword is provided to indicate that a frame of the encoded video has been changed to represent a visible watermark. After the keyword 200, the additional data includes a UMID 202 in accordance with the SMPTE standard. As is known to those skilled in the art a UMID is a Unique Material Identifier (UMID) which uniquely identifies the video material. After the UMID 202, a flag 204 is provided to indicate the type of watermark. In the present example there are three types of watermark, which are a "mosaic" watermark (explained shortly), a "time code" or a "video format". The time code is extracted as explained above from the video encoded bit stream and used to represent the visible watermark. Correspondingly, the video format, which is provided in the header of the encoded bit stream is extracted and represented as the visible watermark. After the flag indicating the type of watermark, any data which has been extracted from the macroblock data to represent the watermark is provided in the concatenated spare data of the fixed data portions shown in FIGS. 4 and 5. As shown in FIG. 6 the keyword, the UMID and the flag of watermark type are provided illustratively in a concatenated data field 207. The concatenated data field represents conceptually, all the spare data bearing capacity from the image frame, which is available for conveying the additional watermark data. Finally, in the last data position, a template bitmap 208 is provided.

The keyword may be provided in a predetermined position, so that it can be detected by a decoder/watermark remover. For example, the keyword is inserted in the first free data area of the frame. As shown in FIG. 6, the template bitmap includes a bit for every macroblock in the image frame. The bit is set to a predetermined value, for example a "0" if the macroblock has not changed or to a "1" if the macroblock has changed in that it represents a macroblock of the watermark. In an alternative example, the template bitmap may include a bit for every DCT coefficient of each macroblock, so that if the DCT coefficient has changed then this is represented by corresponding predetermined values such as a 0 or a 1. As shown in FIG. 6 the template bitmap is stored in the concatenated data field. In some examples of the present technique the bitmap may be entropy encoded.

Example Watermarking Techniques

Figure 7:
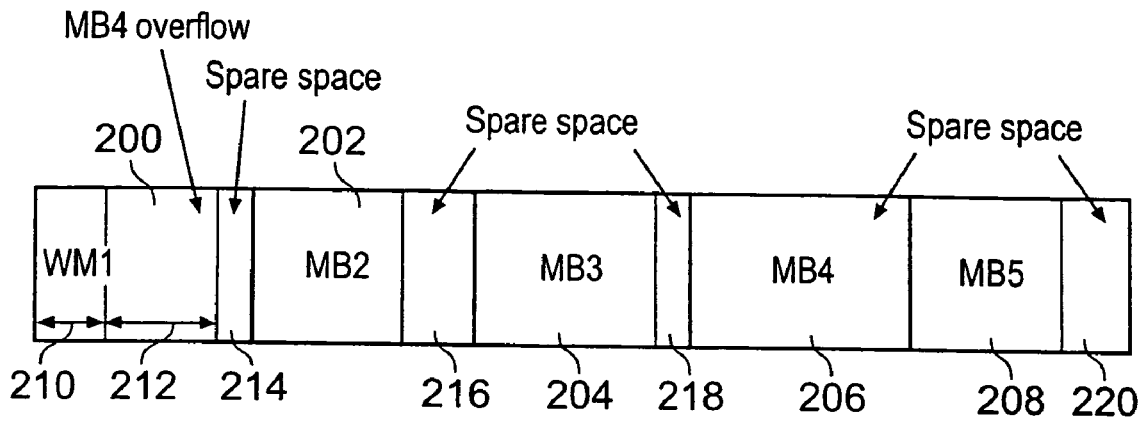
FIG. 7 is a schematic representation of another example compression encoded bit stream in accordance with the Digital Video mode format illustrating an example in which a macroblock, which forms part of a watermark represented in an image frame has been introduced into a segment of macroblocks.

There are various techniques that can be employed to represent a watermark in the compression encoded bit stream. In one example, selected macroblocks in the image can be replaced with macroblocks, which form the watermark in the image. FIG. 7 provides an example in which the macroblock segment of FIG. 4 is adapted to include one macroblock of the watermark WM1. As for the example shown in FIG. 4, five of the data areas 200, 202, 204, 206, 208 are provided to accommodate the encoded data representing the five macroblocks MB1, MB2, MB3, MB4, MB5 of the macroblock segment. In this example, the first macroblock MB1 is replaced with a macroblock from the watermark WM1. As shown in this example, the data representing the watermark block WM1 occupies only a relatively small portion 210 of the capacity allocated to the first macroblock MB1 in the encoded bit stream. For this example, an amount of data which is required to represent the fourth macroblock MB4 exceeds the capacity available from the area 200 allocated to the fourth macroblock MB4. As such, the remaining data representing the fourth macroblock MB4 is packed into an area 212 of the first macroblock area 200. However, there remains and area 214 available for conveying the additional watermark data which is required to represent the watermark in the encoded bit stream. Furthermore, other areas 216, 218, 220 are available for conveying the additional data. The additional data includes the removed first macroblock data and DCT data MB1, and includes the watermark keyword, the UMID, the watermark flags and the bit map indicating the location of the watermark in the image. The additional data is distributed over all the areas of spare data, which forms the concatenated spare data.

Figure 8:
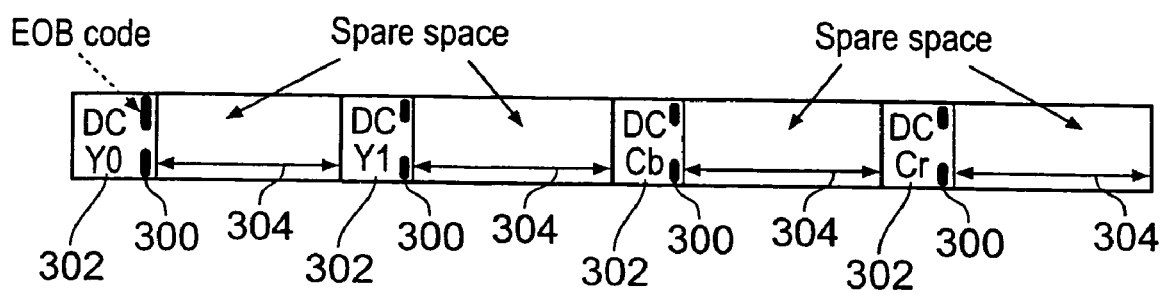
FIG. 8 is a schematic representation of a DCT coefficients from which a watermark macroblock is comprised for the example of a mosaic watermark.

As indicated above another of the visible watermarking types is a mosaic. A mosaic is created by extracting the AC coefficients of a macroblock and representing the watermarked macroblock by the DC coefficients only. Such an arrangement is illustrated in FIG. 8. In FIG. 8, the watermark macroblock WM1 from the example shown in FIG. 7 is encoded to form part of a mosaic watermark. In this example, an illustration of the watermark macroblock WM1 is shown to include an extra EOB code 300 after the DC coefficients 302 in each DCT block, which produces a mosaic effect. As shown in FIG. 8, since only the DC coefficient of the DCT block is provided, then spare space exists in an area 304 in each of the DCT blocks within the macroblock. As with the watermarking example shown in FIG. 7, the removed AC coefficients and the EOB code from each DCT block will be added to a collection of watermarking data and spread across the concatenated spare data area in the frame.

Figure 9:
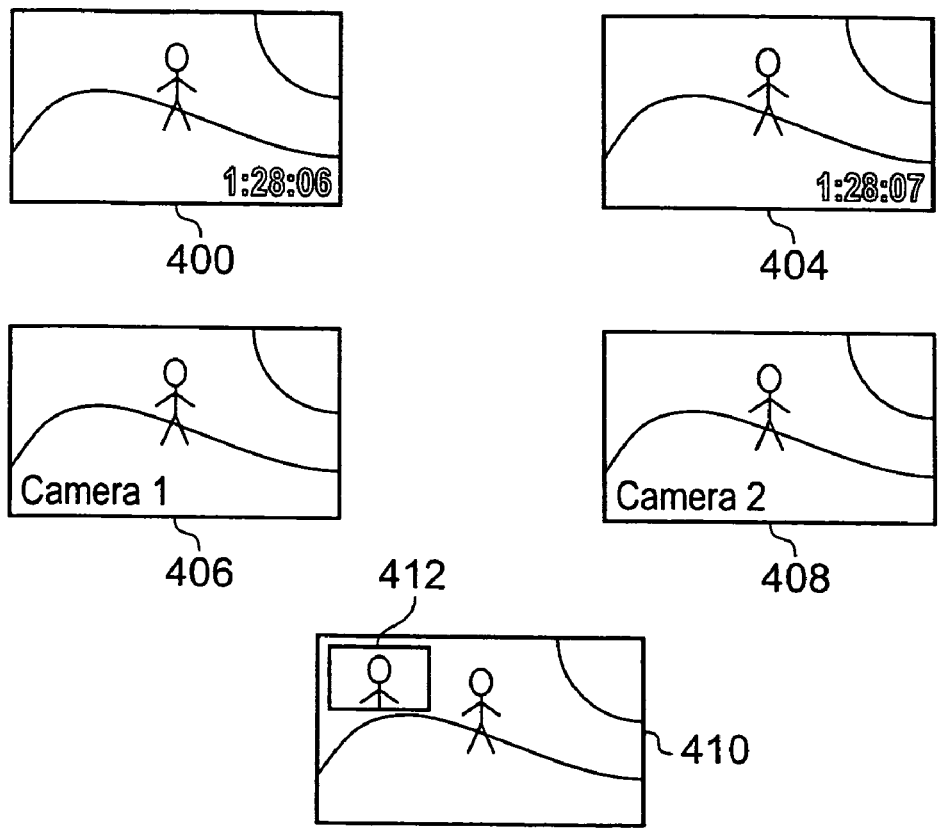
FIG. 9 is a schematic illustration representing possible visible watermarks, which could be introduced into a compression encoded video image using the present technique.

Examples of information, which may be represented by the visible watermark in accordance with the present technique illustrated in FIG. 9. In FIG. 9 five example watermarked images are represented, a first (top) two 400, 404 representing time codes, a second (middle) two 406, 408 representing a camera number which captured the video images and a third 410 (bottom) image representing a visible watermarked from video proxy. As illustrated, the top two example images have been encoded with the time code and accordingly there is a change in the time code 400 from one image to the next 404. In another example the same image has been captured by different cameras so that the left hand image 406 has been captured by CAMERA 1 and the right hand image 408 has been captured by a CAMERA 2. Correspondingly, the visible watermark represents the CAMERA 1 or 2 which has generated the image. In the last example, the watermarked image 410 includes proxy video 412 inserted at an appropriate location within an example image. In one example, the proxy video is formed from a low resolution version of the other video images formed by the second camera CAMERA 2 and is presented within the video image produced by the first camera, CAMERA 1. As such, a viewer can compare the same scene from two different view points provided by the two cameras.

Figure 10:
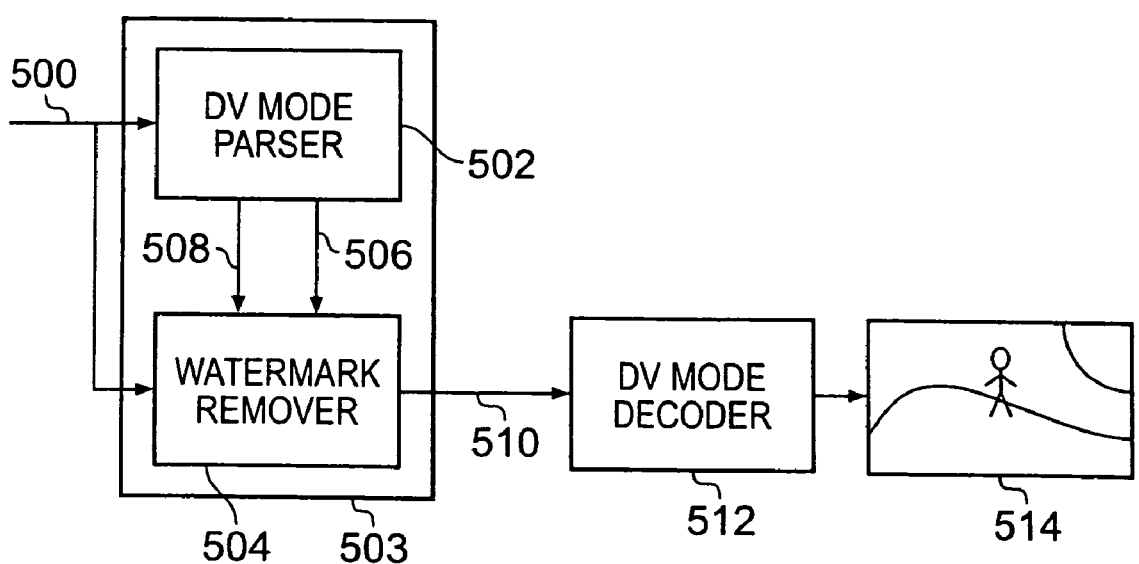
FIG. 10 is a schematic block diagram of a data processing apparatus for removing a visible watermark form a compression encoded video image which has been watermarked using the encoding data processing apparatus shown in FIGS. 3A and 3B.

FIG. 10 provides an example arrangement for removing the visible watermark form video images which have been encoded with the encoding data processing apparatus shown in FIGS. 3A and 3B in accordance with the present technique. As shown in FIG. 10 the watermark encoded video images are received on a channel 500 by a DV mode parser 502 and a watermark remover 504 within a data processing apparatus 503. The DV mode parser 502 parses the video encoded bit stream to identify for each frame whether the keyword is present in the first area of spare capacity within each encoded image frame. If the keyword is present then the data associated with the visible watermark is extracted and fed to the watermark remover 504 via connecting channel 506.

In an alternative embodiment, the DV mode parser 502 is operable to parse the compression encoded bit stream to determine a total amount of spare data capacity in each frame, provided from each of the fixed data portions, as a result of the fixed data portion not being completely filed with the macroblocks. The DV mode parser 504 performs the same operation as that performed by the DV mode parser to identify the spare space within the compression encoded bit stream and thereby to identify the additional data associated with the visible watermark. From this spare data area, the first part of that data area, may in some embodiments include the keyword which is provided to indicate that the image frame has been watermarked, or alternatively the DV mode parser assumes that the image contains a watermark. If a keyword is identified, then the additional data is extracted and fed to the watermark remover 504 via connecting channel 506.

A signal indicating the presence of the keyword in each frame is fed on a channel 508 to the watermark remover 504. Thus the watermark remover 504 is provided for each frame with an indication as to whether the frame has been adapted to represent the visible watermark or not. If the frame has been adapted then the watermark remover identifies the macroblocks or DCT blocks within each frame which have been changed in accordance with the bitmap received for each frame from the DV mode parser 502. The watermark remover then removes the watermark macroblocks and replaces these with the original macroblocks and/or DCT coefficients again provided by the DV mode parser 502 from the additional data, which was extracted from the watermarked image frame. As shown for example in FIG. 8 the encoded bit stream from which the visible watermark has been removed is fed via a connecting channel 510 to a DV mode decoder 512. The DV mode decoder 512 decompresses the video images and regenerates the original images for display on a display screen 514.

SUMMARY OF OPERATION

Figure 11:
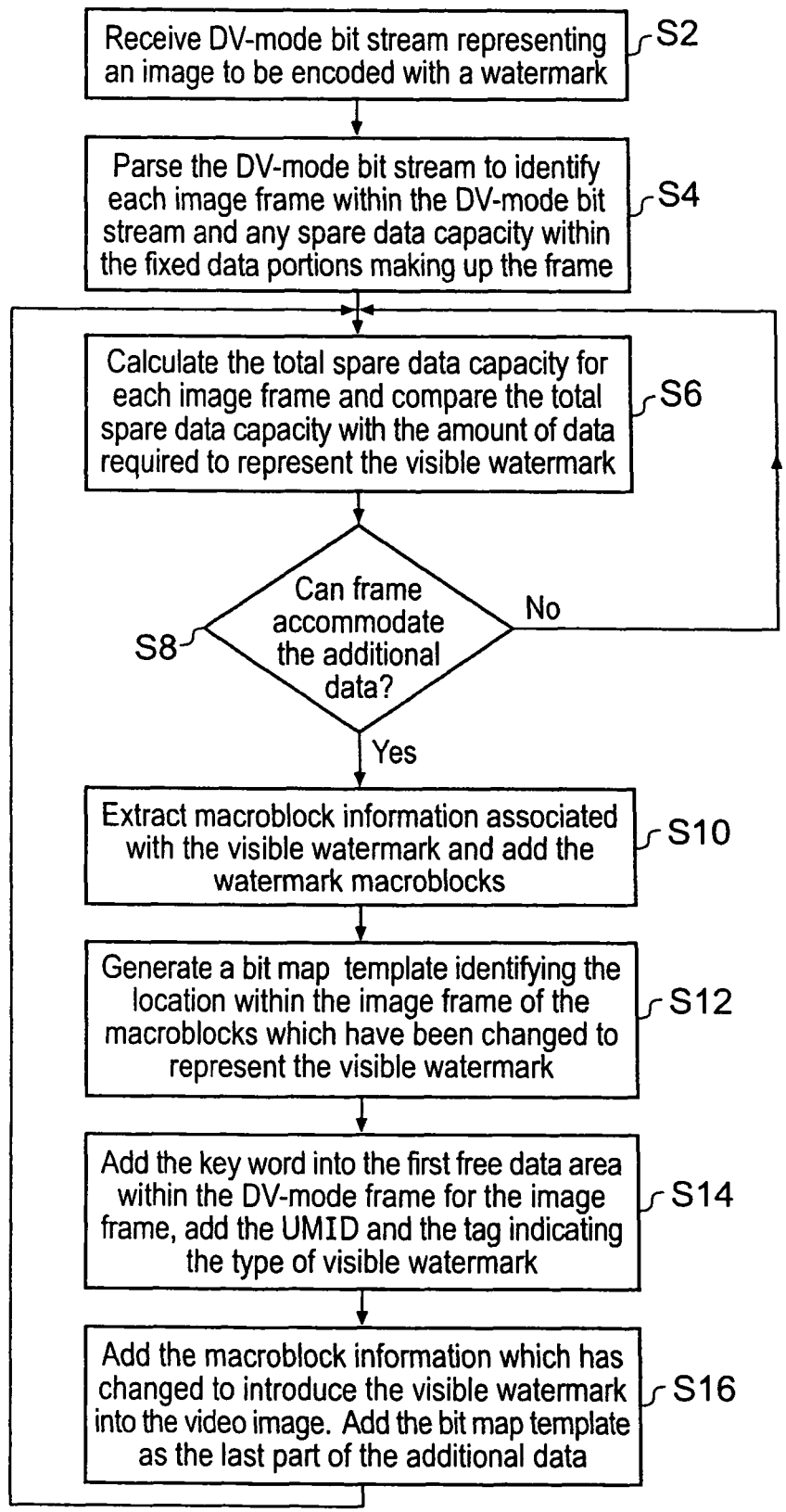
FIG. 11 is a flow diagram representing the operation of an encoding data processing apparatus to introduce a visible watermark into a compression encoded video image.

A flow diagram representing the operation of a watermark encoding data processing apparatus to encode a DV mode bit stream with a visible watermark is represented in FIG. 11, which is summarised as follows:

S2: The image encoded in accordance with a DV mode compression encoding standard is received from a source which may be a camera, a video reproduction apparatus or a television receiver.

S4: The DV mode bit stream is parsed to identify each image frame and that portion of the bit stream parsed to identify the spare data capacity within the fixed data portions making up the frame into which additional data associated with a visible watermark may be introduced.

S6: A total amount of spare capacity is then calculated for each image frame. The total spare data capacity is compared to the total amount of additional data which is required to represent the visible watermark within the image frame. Each image frame is processed in turn, to compare the total spare capacity within that frame to the amount of additional data required to represent the visible watermark.

S8: For the current frame it is then determined whether the frame can accommodate the additional data.

S10: If the frame can accommodate the additional data associated with the visible watermark, then the macroblock information associated with the visible watermark is extracted and replaced with the watermark macroblocks.

S12: A bitmap is then generated providing a template identifying the location within the image frame of the macroblocks, which have been changed to represent the visible watermark. In alternative embodiments the bitmap may identify the DCT coefficients within each image block which have been changed in order to represent the visible watermark. This will depend on the type of watermark being introduced into the image frame. For example, if the watermark type is a mosaic then the bitmap template may identify the DCT coefficients which have changed. In some cases the bitmap may be entropy encoded.

S14: The keyword indicating that the image frame has been changed to represent a visible watermark is then added into the first free data area within the image frame. A UMID identifying the image frame is then generated and added into the spare data capacity of the image frame along with a flag indicating the type of visible watermark with which the image frame has been coded to represent that watermark.

S16: The extracted macroblock information, which represents a change from an original form of the macroblock, the change being made to represent part of the visible watermarking is then added to the spare data capacity within the fixed portions of the image frame. Finally, the bitmap template is added as the last part of the additional data in the spare capacity area of the image frame. Processing then proceeds with the next image frame from step S6.

Figure 12:
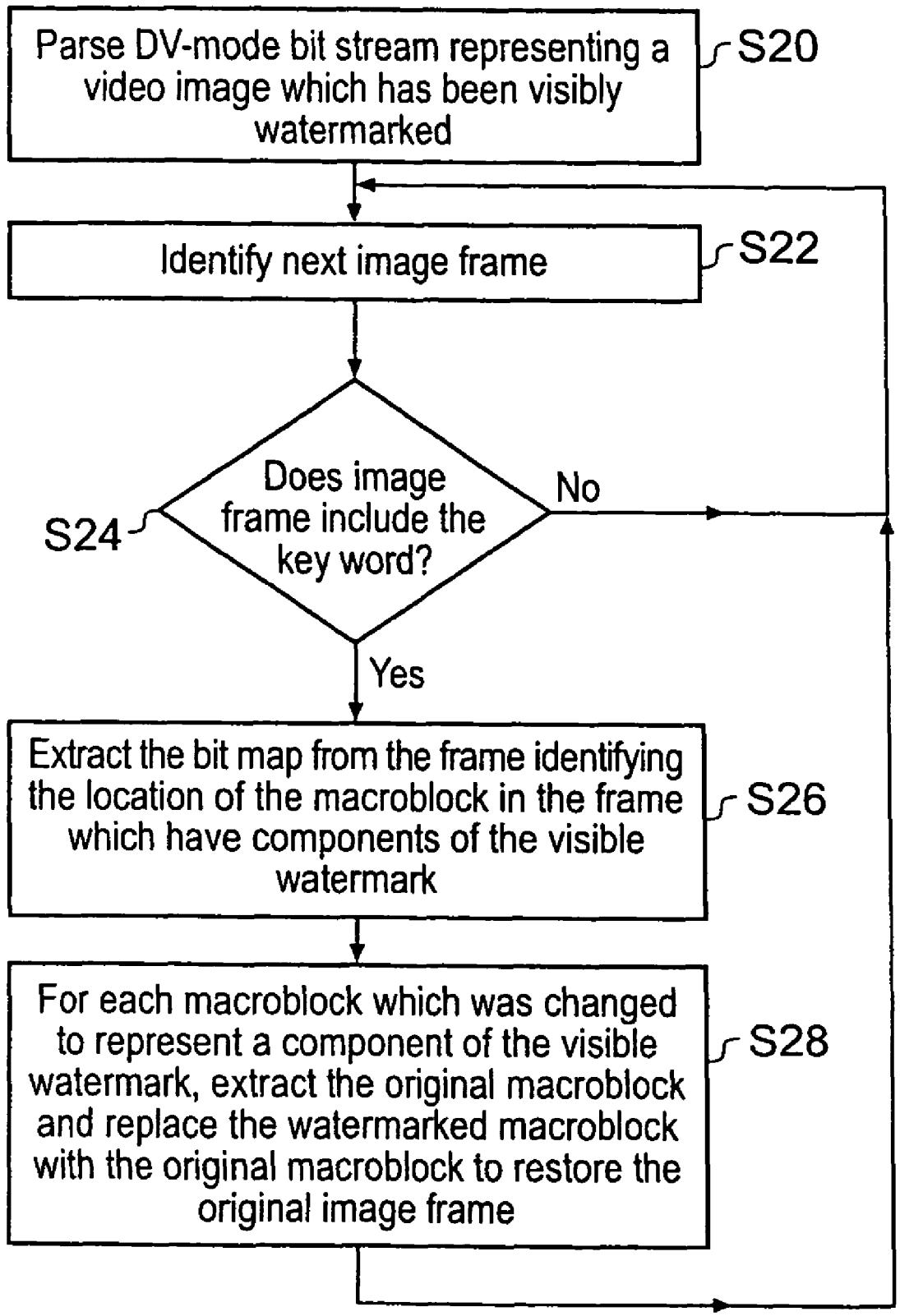
FIG. 12 is a flow diagram representing the operation of a data processing apparatus which is arranged to remove a visible watermark form a compression encoded video image.

A flow diagram illustrating the operation of a data processing apparatus, which is arranged to wash the watermark from an encoded bit stream is provided in FIG. 12. FIG. 12 is summarized as follows:

S20: The DV mode bit stream which includes a visible watermark is received for washing the watermark from the video image represented by the bit stream. The bit stream is then parsed in order to identify the image frames represented by the compression encoded bit stream.

S22: Each of the image frames is identified and analyzed in turn.

S24: Each image frame is then analyzed to determine whether in the first free space of the compression encoded bit stream there is the predetermined keyword.

S26: If the keyword is present in the compression encoded image frame then the bitmap information is extracted form the last position of the additional data within the spare data capacity provided within the image frame. The bitmap is extracted and the location of the macroblocks which have changed to represent the visible watermark are identified.

S28: For each macroblock which was changed to represent a component of the visible watermark the original macroblock corresponding to that changed macroblock is extracted and replaced with the original macroblock to restore the original image frame. Processing then proceeds to step S22. Correspondingly, if the image frame does not include a keyword then processing proceeds with the next image frame at step S22.

It will be appreciated that the present invention finds application for encoding metadata relating to particular video images as a visible watermark. The metadata displayed as a visible watermark can assist for example an editor to assemble a video stream, the visible watermark being invertible and/or removable. It will be appreciated that video images may be visibly watermarked as they are captured by a camera/recorder device. Pre-existing video image data stored on recording medium may be fed to a watermark encoder and re-coded to include visible watermark(s). It will further be appreciated that the visible watermark can be used in a content brokering or distribution system in which a first client computer makes visibly watermarked images available to a second client computer. A user of the second client computer views the visibly watermarked images and decides he would like to view or use the video images with visible watermark(s) and makes a request to the first client computer (or a server computer which is adapted to act on behalf of the owner or other rights holder of the video images) to obtain visible watermark removal data. In such as system a watermark remover uses the watermark removal data may be implemented in the second client computer.

Various modifications may be made to the example embodiments herein before described without departing from the scope of the present invention. For example, the DV mode is one example compression-encoding standard with which embodiments of the present invention find application.

The invention claimed is:

1. An encoding data processing apparatus operable to introduce a visible watermark into a compression encoded video image represented by a compression encoded bit stream having a predetermined format, the format of the compression encoded bit stream providing image frames which are represented by macroblocks, each macroblock representing a block of pixels from the image frame, the macroblocks being formed into groups of macroblocks which are contained in fixed portions of the compression encoded bit stream, the fixed data portions being able to accommodate a predetermined fixed amount of data in the compression encoded bit stream, the encoding data processing apparatus comprising:
a processor configured
to parse the compression encoded bit stream to identify each of the frames of the video image, and to determine for each image frame areas of the compression encoded bit stream providing spare data capacity as a result of the fixed data portion not being completely filled with the macroblocks;
to first check within the macroblocks that form the image frame whether an additional amount of data required to represent the entire visible watermark can be accommodated in a memory space formed by the spare data capacity of the image frame;
and after it has been determined that the additional data for representing the entire visible watermark can be accommodated within the spare data capacity,
to change selected macroblocks of the image frame to represent the visible watermark;
to generate a bit pattern representing the macroblocks in the original image frame which have changed to represent the visible watermark; and
to insert all the additional data into the areas providing the spare data capacity of the fixed data portions of the image frame, the additional data including the bitmap and data associated with an original form of each of the macroblocks which have changed to represent the entire visible watermark.

2. An encoding data processing apparatus as claimed in claim 1, wherein the processor is configured to insert a keyword into the fixed data portions at a predetermined position for image frames into which the additional data has been added to represent the visible watermark.

3. An encoding data processing apparatus as claimed in claim 1, wherein the visible watermark is different between two or more image frames.

4. An encoding data processing apparatus as claimed in claim 1, wherein the visible watermark represents a time code, the time code being extracted from the compression encoded bit stream.

5. An encoding data processing apparatus as claimed in claim 1, wherein the visible watermark represents data indicating a video compression encoding standard in accordance with the predetermined format of the compression encoded video images, the data indicating the video compression encoding standard being extracted from the compression encoded bit stream.

6. An encoding data processing apparatus as claimed in claim 1, wherein the visible watermark represents proxy video.

7. An encoding data processing apparatus as claimed in claim 1, further comprising:
a watermark generator operable to provide watermark data which is to be represented as the visible watermark in the video image.

8. An encoding data processing apparatus as claimed in claim 2, wherein the additional data added to each image frame comprises the keyword indicating that the image frame has been changed to represent a visible watermark, a Universal Material Identifier (UMID), a flag indicating a type of the watermark, and data indicating an amount of data which has been removed from the video encoded bit stream at predetermined positions within the compression encoded bit stream.

9. An encoding data processing apparatus as claimed in claim 1, wherein the macroblocks are formed from a plurality of transform domain coefficients and the bitmap indicates which of the transform domain coefficients in each macroblock have changed.

10. An encoding data processing apparatus as claimed in claim 1, wherein the processor is configured to entropy encode the bitmap before the entropy encoded bitmap is added to the image frame.

11. An encoding data processing apparatus as claimed in claim 1, wherein the video image is encoded to produce the encoded bit stream in accordance with the Society for Motion Picture Television Engineers (SMPTE) Digital Video standard.

12. A method performed on a data processing apparatus of introducing a visible watermark into a compression encoded video image represented by a compression encoded bit stream having a predetermined format, the format of the compression encoded bit stream providing image frames which are represented by macroblocks, each macroblock representing a block of pixels from the image frame, the macroblocks being formed into groups of macroblocks which are contained in fixed portions of data within the compression encoded bit stream, the fixed data portions being able to accommodate a predetermined fixed amount of data, the method comprising:
parsing the compression encoded bit stream on the data processing apparatus to identify each of the frames of the video image, and for each image frame of the compression encoded bit stream to identify areas of spare data capacity provided as a result of the fixed data portion not being completely filed with the macroblocks;

checking within the macroblocks that form the image frame whether an additional amount of data required to represent the entire visible watermark can be accommodated in a memory space formed by the spare data capacity of the image frame;

and after said determining has found that the additional data for representing the entire visible watermark can be accommodated within the spare data capacity, changing selected macroblocks of the image frame to represent the visible watermark;

generating a bit pattern by the data processing apparatus representing the macroblocks in the original image frame which have changed to represent the visible watermark; and inserting all the additional data into the areas providing the spare data capacity of the fixed data portions of the image frame, the additional data including the bitmap and data associated with an original form of each of the macroblocks which have changed to represent the entire visible watermark.

13. An encoding data processing apparatus as claimed in claim 1, the processor further being configured to generate a compression encoded bit stream, wherein the compression encoded bit stream having a predetermined format providing image frames which are represented by macroblocks, each macroblock representing a block of pixels from the image frame, the macroblocks being formed into groups of macroblocks which are contained in fixed portions of data within the compression encoded bit stream, the fixed data portions having a predetermined fixed amount of data, and including, in a spare data area of the fixed data portions which are not occupied by macroblocks, additional data, the additional data including a bit pattern representing the macroblocks in the original image frame which have changed to represent the visible watermark, and data associated with an original form of each of the macroblocks which have changed to represent the visible watermark.

14. An encoding data processing apparatus as claimed in claim 13, wherein the additional data added to each image frame comprises the keyword indicating that the image frame has been changed to represent a visible watermark, a Universal Material Identifier (UMID), a flag indicating a type of the watermark, data indicating an amount of data which has been removed from the video encoded bit stream in predetermined positions within the adapted compression encoded bit stream which represents the visibly watermark image frame.

15. An encoding data processing apparatus as claimed in claim 1, the processor further being configured to generate a data file including compression encoded data, the compression encoded data having a predetermined format providing image frames which are represented by macroblocks, each macroblock representing a block of pixels from the image frame, the macroblocks being formed into groups of macroblocks which are contained in fixed portions of data within the compression encoded bit stream, the fixed data portions having a predetermined fixed amount of data, and including, in a spare data area of the fixed data portions which are not occupied by macroblocks, additional data, the additional data including a bit pattern representing the macroblocks in the original image frame which have changed to represent the visible watermark, and data associated with an original form of each of the macroblocks which have changed to represent the visible watermark.

16. A decoding data processing apparatus operable to remove a visible watermark from a compression encoded bit stream produced by the encoding data processing apparatus according to claim 1, the compression encoded bit stream having a predetermined format providing image frames which are represented by macroblocks, each macroblock representing a block of pixels from the image frame, the macroblocks being formed into groups of macroblocks which are contained in fixed portions of data within the compression encoded bit stream, the fixed data portions being able to accommodate a predetermined fixed amount of data, wherein some of the image frames may include, in a spare data area of the fixed data portions which are not occupied by macroblocks, additional data, the additional data including a bit pattern representing the macroblocks in the original image frame which have changed to represent the visible watermark, and data associated with an original form of each of the macroblocks which have changed to represent the visible watermark, the decoding data processing apparatus comprising:

a processor configured to parse the compression encoded bit stream, to identify image frames of the video images represented by the compression encoded bit stream;

to determine whether the image frames include a visible watermark;

and if the image frames include a visible watermark, to recover from the additional data within the image frame the bit pattern providing the location of the macroblocks which have changed to represent the visible watermark;

to recover the data associated with the original form of each of the macroblocks which changed to represent the visible watermark; and to regenerate the original macroblocks identified by the bit pattern using the data associated with the original form of each of the macroblocks to remove the visible watermark from the image.

17. A decoding data processing apparatus as claimed in claim 16, wherein the compression encoded bit stream representing the video images with the visible watermark includes a keyword at a predetermined position in each image frame which has been adapted to represent the visible watermark, the decoding data processing apparatus being operable to determine whether each of the image frames includes a visible watermark by detecting whether the keyword is present at the predetermined position within each image frame.

18. A method performed on a data processing apparatus of removing a visible watermark from a compression encoded bit stream produced by the method of encoding as claimed in claim 12, the compression encoded bit stream having a predetermined format providing image frames which are represented by macroblocks, each macroblock representing a block of pixels from the image frame, the macroblocks being formed into groups of macroblocks which are contained in fixed portions of data within the compression encoded bit stream, the fixed data portions having a predetermined fixed amount of data, wherein some of the image frames may include in a spare data area of the fixed data portions which are not occupied by macroblocks additional data, the additional data including a bit pattern representing the macroblocks in the original image frame which have changed to represent the visible watermark, and data associated with an original form of each of the macroblocks which have changed to represent the visible watermark, the method comprising:

parsing the compression encoded bit stream by the data processing apparatus, to identify image frames of the video images represented by the compression encoded bit stream;

determining whether the image frames include a visible watermark;

and if the image frames include a visible watermark, recovering from the additional data within the image frame the bit pattern providing the location of the macroblocks which have changed to represent the visible watermark;

recovering the data associated with the original form of each of the macroblocks which changed to represent the visible watermark; and regenerating by the data processing apparatus the original macroblocks identified by the bit pattern using the data associated with the original form of each of the macroblocks to remove the visible watermark from the image.

19. A non-transitory computer readable medium having program code stored thereon, which when executed on a computer performs a method of introducing a visible watermark into a compression encoded video image represented by a compression encoded bit stream having a predetermined format, the format of the compression encoded bit stream providing image frames which are represented by macroblocks, each macroblock representing a block of pixels from the image frame, the macroblocks being formed into groups of macroblocks which are contained in fixed portions of data within the compression encoded bit stream, the fixed data portions being able to accommodate a predetermined fixed amount of data, the method comprising:

parsing by the computer the compression encoded bit stream to identify each of the frames of the video image, and for each image frame of the compression encoded bit stream to identify areas of spare data capacity provided as a result of the fixed data portion not being completely filed with the macroblocks;

checking within the macroblocks that form the image frame whether an additional amount of data required to represent the entire visible watermark can be accommodated in the spare data capacity of the image frame;

and after said determining has found that the additional data for representing the entire visible watermark can be accommodated within the spare data capacity, changing selected macroblocks of the image frame to represent the visible watermark;

generating by the computer a bit pattern representing the macroblocks in the original image frame which have changed to represent the visible watermark; and inserting all the additional data into the areas providing the spare data capacity of the fixed data portions of the image frame, the additional data including the bitmap and data associated with an original form of each of the macroblocks which have changed to represent the entire visible watermark.

20. A non-transitory computer readable medium having program code stored thereon, which when executed on a computer performs a method of removing a visible watermark from a compression encoded bit stream produced by the method of encoding as claimed in claim 12, the compression encoded bit stream having a predetermined format providing image frames which are represented by macroblocks, each macroblock representing a block of pixels from the image frame, the macroblocks being formed into groups of macroblocks which are contained in fixed portions of data within the compression encoded bit stream, the fixed data portions having a predetermined fixed amount of data, wherein some of the image frames may include in a spare data area of the fixed data portions which are not occupied by macroblocks additional data, the additional data including a bit pattern representing the macroblocks in the original image frame which have changed to represent the visible watermark, and data associated with an original form of each of the macroblocks which have changed to represent the visible watermark, the method comprising:

parsing by the computer the compression encoded bit stream, to identify image frames of the video images represented by the compression encoded bit stream;

determining whether the image frames include a visible watermark;

and if the image frames include a visible watermark, recovering from the additional data within the image frame the bit pattern providing the location of the macroblocks which have changed to represent the visible watermark;

recovering the data associated with the original form of each of the macroblocks which changed to represent the visible watermark; and regenerating by the computer the original macroblocks identified by the bit pattern using the data associated with the original form of each of the macroblocks to remove the visible watermark from the image.

* * * * *